3,148,171
EPOXIDIZING POLYHYDRIC PHENOL USING
A NEUTRAL AMIDE CATALYST
William E. St. Clair, Meadowood, Butler, and Barrymore
T. Larkin, Slickville, Pa., assignors to Koppers Company, Inc., a corporation of Delaware
No Drawing. Filed Mar. 16, 1962, Ser. No. 180,321
8 Claims. (Cl. 260—47)

This invention relates to the etherification of polyhydric phenols. In one specific aspect, it relates to the preparation of chlorohydrin ethers of polyhydric phenols, which are useful intermediates in the preparation of epoxides. In a further aspect, it relates to an improvement in the epoxidation of polyhydric phenols involving the intermediate formation of a chlorohydrin ether.

Epoxy resins and epoxyalkyl aryl ethers have become commercially significant as components in adhesive formulations. A number of methods have been developed for the direct preparation of these materials from polyhydric phenols. One excellent method, involving adding, as concentrated aqueous solution, half a molar equivalent of alkali metal hydroxide to a heated and agitated solution of polyhydric phenol dissolved in excess epichlorohydrin while maintaining the solution under total reflux, and thereafter adding half a molar equivalent of the aqueous caustic while distilling water vapor and epichlorohydrin from the reaction mixture, is described in U.S. Patent 2,995,583 of Barrymore T. Larkin and William E. St. Clair. Unfortunately, the Larkin and St. Clair process and other processes involving direct preparation of the epoxide in aqueous media, cannot be used for the epoxidation of polyhydric phenols which are initially water-soluble. Such materials can be directly epoxidized using the well-known alcoholic process of William E. St. Clair, described in U.S. Patent 2,892,809.

The epoxidation of the initially water-soluble materials using an aqueous medium in the final step proceeds via the intermediate preparation of the water-insoluble chlorohydrin ether. Known processes based on the intermediate chlorohydrin ether formation involve reacting the polyhydric phenol with an excess of epichlorohydrin at an elevated temperature under substantially anhydrous conditions in the presence of a tertiary amine catalyst to form a chlorohydrin ether, and subsequently dehydrochlorinating the ether in aqueous caustic to form the epoxide. The catalyst and excess epichlorohydrin are removed from the epoxide by devolatilization. Unfortunately, amines form salts with the acidic phenolic resins which cannot be removed along with the excess epichlorohydrin. These amine salts catalyze the reaction of epoxy groups with active hydrogen atoms and with themselves on exposure to heat. Therefore, during the heating step to remove the epichlorohydrin, a substantial quantity of the epoxide cross-links or gels, thereby losing its effective adhesive properties and making it unsuitable for its intended use. The excess epicholorohydrin must, of course, be removed in order to avoid a final product of high residual chlorine content. High residual chlorine imparts a corrosive nature to the product adhesive and such adhesives are totally unsuitable for metal to metal bonding.

We have discovered a novel improvement in the chlorohydrin ether preparation which unexpectedly eliminates the formation of undesirable salts, thereby permitting the separation of the subsequently formed epoxide from the catalyst and the excess epichlorohydrin without causing substantial gellation or cross-linking of the epoxide.

It is, therefore, an object of the invention to provide an improved method for making epoxides from polyhydric phenols via the chlorohydrin ether route.

In accordance with the invention, a polyhydric phenol is first reacted with epichlorohydrin at an elevated temperature under substantially anhydrous conditions in the presence of a catalytic amount of a neutral amide catalyst. The chlorohydrin ether is subsequently dehydrochlorinated with aqueous caustic to form the epoxide and the catalyst and excess epichlorohydrin are removed from the epoxide by devolatilization without causing substantial cross-linking or gellation of the epoxide.

Any polyhydric phenol is useful as a starting material in the invention. Typical polyhydric phenols include resorcinol, hydroquinone, methyl resorcinol, phloroglucinol, 1,5-dihydroxynaphthalene, 4,4'-dihydroxydiphenol, bis(4-hydroxyphenyl)methane, 1,1-bis(4-hydroxyphenyl)ethane, 1,1-bis(4-hydroxyphenyl)isobutane, 2,2-bis(4-hydroxyphenyl)propane which is termed bis-phenol hereinafter for convenience, 2,2-bis(4-hydroxy-2-methylphenyl)propane, 2,2-bis(2-hydroxy-4-tertiarybutylphenyl)propane, 2,2-bis(2-hydroxyphenyl)propane, 2,4'-dihydroxydiphenyldimethylmethane, 2,2-bis(2-chloro-4-hydroxypenyl)propane, 2,2-bis(2-hydroxynaphthyl)pentane, 2,2-bis(2,5-dibromo-4-hydroxyphenyl)butane, 4,4-dihydroxybenzophenone, 1,3-bis(4-hydroxyphenyloxy)-2-hydroxypropane, 3-hydroxyphenyl salicylate, 4-salicoylamino-phenol, as well as more complex polyhydric phenols, such as water-insoluble novolac resins obtainable by the acid-catalyzed condensation of phenol, p-cresol, or other substituted phenols with aldehydes such as formaldehyde, acetaldehyde, crotonaldehyde. The polyhydric phenols contain 2 or more phenolic hydroxyl groups in the average molecule thereof and are free of other functional groups which would interfere with formation of the desired glycidyl ethers.

The method of the invention is particularly useful when a water-soluble polyhydric phenol is used as the starting material, since these materials cannot, as noted hereabove, be epoxidized directly in aquous alkaline media. Particularly useful water-soluble polyhydric phenols include the fusible acid-catalyzed resorcinol-formaldehyde resins prepared according to U.S. Patent 2,385,372 of Philip Hamilton Rhodes. Norton, U.S. 2,385,370, describes useful water-soluble base-catalyzed resorcinol-formaldehyde resins, and soluble, fusible phenol-rescorcinol-formaldehyde resins are described by Rhodes in U.S. 2,385,373.

The formation of the chlorohydrin ether is accomplished under substantially anhydrous conditions by dissolving the polyhydric phenol in an excess of epichlorohydrin. In order to make the reaction proceed smoothly, the epichlorohydrin should be present in an amount ranging between three and six molar equivalents per equivalent of polyhydric phenol. At least three equivalents must be present in order to drive the reaction to completion in a reasonable period of time and greater than six equivalents is unnecessary because of the obvious problem of separating unreacted epichlorohydrin at a later stage in the process.

Substantially anhydrous conditions for the chlorohydrin ether formation are conveniently achieved by the azeotropic distillation of the solution of polyhydric phenol in epichlorohydrin. The water-soluble polyhydric phenols used in the invention tend to be hygroscopic and, as such, contain water which should be removed to avoid degradation of the epichlorohydrin by ring opening to form a glycol. After removal of the water, the etherification catalyst is added to the solution.

Catalysts useful in the invention are neutral amides, e.g. those amides having the formula:

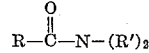

wherein R is a lower alkyl or benzyl radical and R' is a lower alkyl radical. Preferred amides, because of their commercial availability, are N,N-dimethylformamide, N,N-dimethylacetamide, diethyl benzamide, tetramethyl oxalamide, tetraethyl oxalamide, and the like.

The catalyst should be present in an amount ranging between 0.1 and 10%, based on the weight of the polyhydric phenol. If less than 0.1% is used, the reaction tends to proceed at a very slow rate, and no advantage is seen in using amounts greater than 10%. A preferred catalyst concentration is 0.5 to 2%.

During the formation of the chlorohydrin ether, the reaction mixture containing the catalyst is heated to an elevated temperature ranging between 60° C. and the reflux temperature. At temperatures below 60° C. the reaction proceeds slowly; if the temperature is increased, the rate of reaction increases. It is preferred, therefore, to choose reaction temperatures approaching the reflux temperature to effect etherification in the shortest possible reaction time.

The formation of the chlorohydrin ether is generally complete in one to two hours. Shorter reaction times result in a somewhat lower yield; appreciably longer times, in the range of three to four hours, result in too high a chlorine content in the chlorohydrin ether.

After etherification is complete, the chlorohydrin ether can be isolated by distilling therefrom the catalyst and excess epichlorohydrin, or the crude reaction mixture can be used directly in the formation of the epoxide. The epoxide is formed by dehydrochlorination using aqueous caustic, according to the same procedures used for the direct preparation of epoxides in aqueous media. Thus, dehydrochlorination can be accomplished substantially according to the procedure described in Larkin and St. Clair, U.S. 2,995,583, by adding concentrated aqueous caustic, e.g. 70–74% by weight, to the chlorohydrin ether in an amount approximately equal to half a molar equivalent of polyhydric phenol and thereafter adding half a molar equivalent of aqueous caustic while distilling vapors of water and epichlorohydrin from the reaction mixture. The vapors are condensed, the water of condensation is discharged and the epichlorohydrin is returned to the reaction mixture. Alternatively, the dehydrochlorination can be accomplished by the procedure described in Goppel, U.S. 2,801,227. After the conversion of the chlorohydrin ether to the epoxide is complete, which generally occurs in one to two hours, the reaction mixture is cooled and filtered to remove salt. The cooling step is helpful since the salt particles are thereby deposited as larger crystals which can be easily removed by filtration.

The excess epichlorohydrin and catalyst are removed by distillation. As a matter of convenience, the mixture can be distilled, first at atmospheric pressure, and, after a period of time, the distillation continued under vacuum. Reduced pressure of 5–60 mm. of Hg are satisfactory for the vacuum devolatilization. The product thus obtained is ready for use.

Our invention is further illustrated by the following examples:

*Example I*

A reactor was charged with 235 parts by weight resorcinol-formaldehyde resin (one mole of resorcinol condensed with each 0.62 mole formaldehyde), 1500 parts by weight epichlorohydrin and 2.35 parts by weight (1%) dimethyl formamide. The reaction mixture was heated with vigorous stirring to the reflux temperature (118° C.) and maintained at reflux for 62 minutes. The reaction vessel contents were then devolatilized under increasing vacuum to a final temperature of 135° C. at 16 mm. of Hg pressure over a period of 110 minutes. There was recovered 531 parts by weight resin chlorohydrin ether, having a chlorine content of 15.4 weight percent.

*Example II*

The chlorohydrin ether product of Example I, 266 parts by weight, and epichlorohydrin, 555 parts by weight, were charged to the reaction vessel. The chlorohydrin ether was dissolved in epichlorohydrin, brought to reflux (116° C.) with vigorous stirring, and approximately one molecular equivalent of 70 percent by weight aqueous caustic was added dropwise over a period of 62 minutes. The reaction mixture was maintained at total reflux during the first half of the caustic addition. During the second half of the caustic addition, water and epichlorohydrin were removed by azeotropic distillation according to the method described in U.S. Patent 2,995,583 of Larkin and St. Clair. The reaction mass was cooled, filtered to remove precipitated salt, and devolatilized under increasing vacuum to 136° C. at 16 mm. Hg final pressure. There was thus obtained 228 parts by weight of epoxidized resorcinol-formaldehyde resin having an oxirane oxygen content of 9.8 percent by weight and a total chlorine content of 1.6 percent by weight.

*Example III*

To a 50-gallon pilot plant resin kettle, there was charged 60 parts by weight resorcinol-formaldehyde resin (one mole of resorcinol condensed with each 0.62 mole of formaldehyde) and 378 parts by weight epichlorohydrin. The charge was heated to reflux (116° C.) in 42 minutes. Trace water was removed by azeotropic distillation over a ten-minute period. The kettle contents were cooled at 35° C. in 68 minutes. There was then added 0.6 part dimethyl formamide, and the kettle contents were reheated to reflux in 38 minutes. The reaction mixture was maintained at reflux for 120 minutes, and one molecular equivalent of 70 percent by weight aqueous caustic was added in a thin stream. After approximately half of the molecular equivalent of the caustic was added, azeotropic distillation was begun to remove the water. The distillation was continued for 28 minutes after all of the caustic was added. The kettle contents were cooled to room temperature over a period of 50 minutes. The reaction mixture was then filtered to remove the precipitated salt and reheated to the reflux temperature in 47 minutes. The catalyst and excess epichlorohydrin were removed by devolatilization to 148° C. at 8 mm. of Hg in 122 minutes. There was obtained 103.5 parts by weight of a completely soluble and fusible epoxidized resorcinol-formaldehyde resin. The product resin had an oxirane oxygen content of 9.5 percent by weight and a total chlorine content of 3.1 percent by weight.

*Example IV*

The procedure of Example III was repeated using 0.6 part triethylamine in place of dimethyl formamide as the catalyst for the chlorohydrin ether formation. The product thus obtained was partially insoluble and infusible, indicating that there had been a measurable degree of cross-linking during the devolatillization to remove the excess epichlorohydrin.

*Example V*

The procedure of Example III was repeated with the exception that the cooling step after the initial devolatilization to remove water from the reactants was omitted. Dimethyl formamide, in an amount corresponding to one percent of the charged resin weight, was added to the refluxing kettle contents over a three to four-minute period as soon as the azeotrope removal of water had been completed. The reaction mixture was maintained at reflux for an additional 120 minutes before adding the 70 percent by weight aqueous caustic. The final product, like that of Example III, was completely soluble and fusible.

*Example VI*

The procedure of Example III was repeated using as a starting material a resorcinol-phenol-aldehyde resin in which the resorcinol comprised approximately 50 percent of phenolic body and the mole ratio of the total phenolic body to formaldehyde was approximately 1:0.62. There was obtained a soluble and fusible epoxy resin having an oxirane oxygen content of 8.9–9.1 percent by weight and a residual chlorine content of 1.4 to 2.1 percent by weight. The product had a softening point of 65 to 73° C. as determined by the Ring and Ball Method.

*Example VII*

The procedure of Example VI was repeated substituting dimethyl acetamide or diethyl benzamide for the dimethyl formamide used as the etherification catalyst. A product substantially identical to that of Example VI is obtained.

*Example VIII*

If resorcinol is substituted for the resin used in Example VI, the resulting product is resorcinol-diglycidyl ether.

We claim:

1. In the epoxidation of a polyhydric phenol wherein the polyhydric phenol is first reacted with epichlorohydrin at an elevated temperature under substantially anhydrous conditions in the presence of a catalyst to form a chlorohydrin ether, the chlorohydrin ether is subsequently dehydrochlorinated with aqueous caustic to form the epoxide, and the catalyst and excess epichlorohydrin are removed from the epoxide by devolatilization, the improvement comprising conducting the polyhydric phenol-epichlorohydrin reaction in the presence of 0.1–10% by weight, based on the weight of the polyhydric phenol, a neutral amide catalyst of the formula:

$$R-\overset{O}{\underset{\|}{C}}-N-(R')_2$$

wherein R is a member selected from the group consisting of benzyl and lower alkyl and R' is a lower alkyl radical, whereby the subsequently formed epoxide can be separated from the catalyst and the excess epichlorohydrin without causing substantial cross-linking of the said epoxide.

2. Method according to claim 1 wherein said amide is N,N-dimethylformamide.

3. Method according to claim 1 wherein said phenol is resorcinol.

4. In the epoxidation of a water-soluble polyhydric phenolic resin wherein the phenolic resin is reacted with epichlorohydrin at an elevated temperature under substantially anhydrous conditions in the presence of a catalyst to form a chlorohydrin ether, the chlorohydrin ether is subsequently dehydrochlorinated with aqueous caustic to form the epoxide, and the catalyst and excess epichlorohydrin are removed from the epoxide by devolatilization, the improvement comprising conducting the phenolic resin-epichlorohydrin reaction in the presence of 0.1 to 10 percent by weight, based on the weight of the phenolic resin of a neutral amide catalyst of the formula:

$$R-\overset{O}{\underset{\|}{C}}-N-(R')_2$$

wherein R is a member selected from the group consisting of benzyl and lower alkyl and R' is a lower alkyl radical, whereby the subsequently formed epoxide can be separated from the catalyst and the excess epichlorohydrin without causing substantial cross-linking of the said epoxide.

5. Method according to claim 4 wherein said resin is a resorcinol-aldehyde resin.

6. Method according to claim 4 wherein said resin is a resorcinol-phenol-aldehyde resin.

7. Method of making a chlorohydrin ether of a polyhydric phenol comprising reacting a polyhydric phenol with epichlorohydrin under substantially anhydrous conditions at an elevated temperature in the presence of 0.1 to 10 percent by weight, based on the weight of the polyhydric phenol, of an amide of the formula:

$$R-\overset{O}{\underset{\|}{C}}-N-(R')_2$$

wherein R is a member selected from the group consisting of benzyl and lower alkyl and R' is a lower alkyl radical.

8. Method of making a chlorohydrin ether of a polyhydric phenol comprising reacting a polyhydric phenol with epichlorohydrin, said epichlorohydrin being present in an amount corresponding to 3–6 molecular equivalents per equivalent of polyhydric phenol, under substantially anhydrous conditions at a temperature between about 60° C. and the reflux temperature of the reaction mixture in the presence of 0.1 to 10 percent by weight, based on the weight of the polyhydric phenol, of a neutral amide of the formula:

$$R-\overset{O}{\underset{\|}{C}}-N-(R')_2$$

wherein R is a member selected from the group consisting of benzyl and lower alkyl and R' is a lower alkyl radical, and recovering said chlorohydrin ether from the reaction mixture by distillation.

References Cited in the file of this patent

UNITED STATES PATENTS

| | | |
|---|---|---|
| 3,033,819 | Price et al. | May 8, 1962 |
| 3,069,434 | Spence et al. | Dec. 18, 1962 |